US007296493B2

(12) United States Patent
Buckingham et al.

(10) Patent No.: US 7,296,493 B2
(45) Date of Patent: Nov. 20, 2007

(54) OFFSET TRANSMISSION SHIFT LEVER AND ISOLATOR ARRANGEMENT

(75) Inventors: David G Buckingham, Berkley, MI (US); William Slifco, Macomb Township, MI (US); Michael Schumacher, Royal Oak, MI (US)

(73) Assignee: Chrysler LLC, Auburn Hills, MI (US)

( * ) Notice: Subject to any disclaimer, the term of this patent is extended or adjusted under 35 U.S.C. 154(b) by 682 days.

(21) Appl. No.: 10/903,667

(22) Filed: Jul. 30, 2004

(65) Prior Publication Data
US 2006/0021459 A1 Feb. 2, 2006

(51) Int. Cl.
*G05G 1/00* (2006.01)
(52) U.S. Cl. .................. 74/470; 74/473.28; 74/473.35
(58) Field of Classification Search .................. 74/470, 74/473.35, 473.28
See application file for complete search history.

(56) References Cited

U.S. PATENT DOCUMENTS 4,811,921 A * 3/1989 Whitaker et al. ........... 244/234
5,347,881 A * 9/1994 Watson et al. ........... 74/473.29
5,452,623 A * 9/1995 Knight .................... 74/473.29
5,845,534 A * 12/1998 Kim ........................ 74/473.12
6,360,627 B1* 3/2002 Buckingham et al. ..... 74/473.3

* cited by examiner

*Primary Examiner*—David M. Fenstermacher
(74) *Attorney, Agent, or Firm*—Thomas A. Jurecko

(57) ABSTRACT

An offset transmission shift lever assembly and isolator arrangement is provided. The shift lever assembly includes an insert arranged to fit over a transmission shift stub. An isolator is provided that encircles the insert and is formed thereto. The isolator has a varying outside diameter such upon assembling the isolator into a canister that encircles the isolator, a portion of the isolator outside diameter is press fit into the canister and another portion of the isolator outside diameter does not contact the canister thereby leaving a gap between the canister and the isolator. The isolator also includes axial holes formed in a lower end thereof and extending axially for a portion of the isolator length. Affixed to the canister is a shift lever aligned parallel to and offset from the shift stub. A fastener is provided for securing the shift lever assembly via the insert to the shift stub.

10 Claims, 2 Drawing Sheets

OFFSET TRANSMISSION SHIFT LEVER AND ISOLATOR ARRANGEMENT

FIELD OF THE INVENTION

The present invention relates generally to a shift lever arrangement for a transmission, and, more particularly, to an improved offset transmission shift lever and isolator arrangement for a motor vehicle.

BACKGROUND OF THE INVENTION

Generally, there are known advantages for using an offset shift lever assembly arrangement that fastens to a transmission shift stub extending into a vehicle interior compartment. One primary advantage is being able to easily remove the shift lever assembly from the transmission by simply unfastening the shift lever assembly from the transmission shift stub. This and other advantages are described in commonly owned U.S. Pat. No. 6,360,627, which is hereby incorporated by reference.

Automotive vehicles of today are being continually refined to improve several areas of performance, such as noise, vibration and harshness (NVH) that would be potentially perceived by a vehicle occupant. These refinements include, among other things, improvements to existing isolation arrangements for a vehicle powertrain, such as improvements to transmission shift lever isolators. Vibrations from powertrain components, such as an engine or a driveline, can be potentially transmitted through a transmission to a shift lever via the transmission shift stub. These transmitted vibrations may result in a visible shaking motion of the transmission shift lever that would be apparent to a vehicle occupant.

Thus, while known transmission shift lever assemblies and known isolator arrangements work for their intended purpose, there is still a need for an improved offset transmission shift lever isolation arrangement capable of further reducing the potential for vibrations to be transmitted from the powertrain to the shift lever.

SUMMARY OF THE INVENTION

Accordingly, an improved offset transmission shift lever and isolator arrangement is provided. In accordance with one aspect of the present invention, an offset shift lever and isolator arrangement is provided that includes a shift stub connected to the transmission and extending into a vehicle compartment. The shift stub includes an axially threaded bore for receiving a fastener. An insert is provided and arranged to fit over the shift stub. The insert includes a partially closed upper end with a fastener shank extending therethrough. An isolator is provided that is formed over and encircles the insert. The isolator includes an upper end and a lower end and a plurality of axial holes formed in the lower end of the isolator and partially extending toward the upper end of the isolator. The isolator has an outside diameter at the upper end that is smaller than an outside diameter at the lower end. A canister is provided and encircles the isolator. The canister includes an inner surface and an outer surface, an open lower end for receiving the isolator and an upper end with an opening for receiving a fastener. The isolator is arranged to be press fit into the canister with the isolator lower end outside diameter being press fit against the canister inner surface and the isolator having a space between the canister inner surface and the isolator upper end outside diameter. A shift lever is provided and affixed to the canister outer surface, and the shift lever is aligned generally parallel and axially off center to the shift stub. A fastener is provided for securing the insert to the shift stub, and the fastener is arranged to threadably engage the threaded bore in the shift stub. The isolator is arranged to absorb powertrain excitations applied to the shift stub to isolate the excitations from the shift lever.

BRIEF DESCRIPTION OF THE DRAWINGS

Other aspects, features, and advantages of the present invention will become more fully apparent from the following detailed description of the preferred embodiment, the appended claims, and in the accompanying drawings in which:

DETAILED DESCRIPTION OF THE PREFERRED EMBODIMENT

Figure 1:
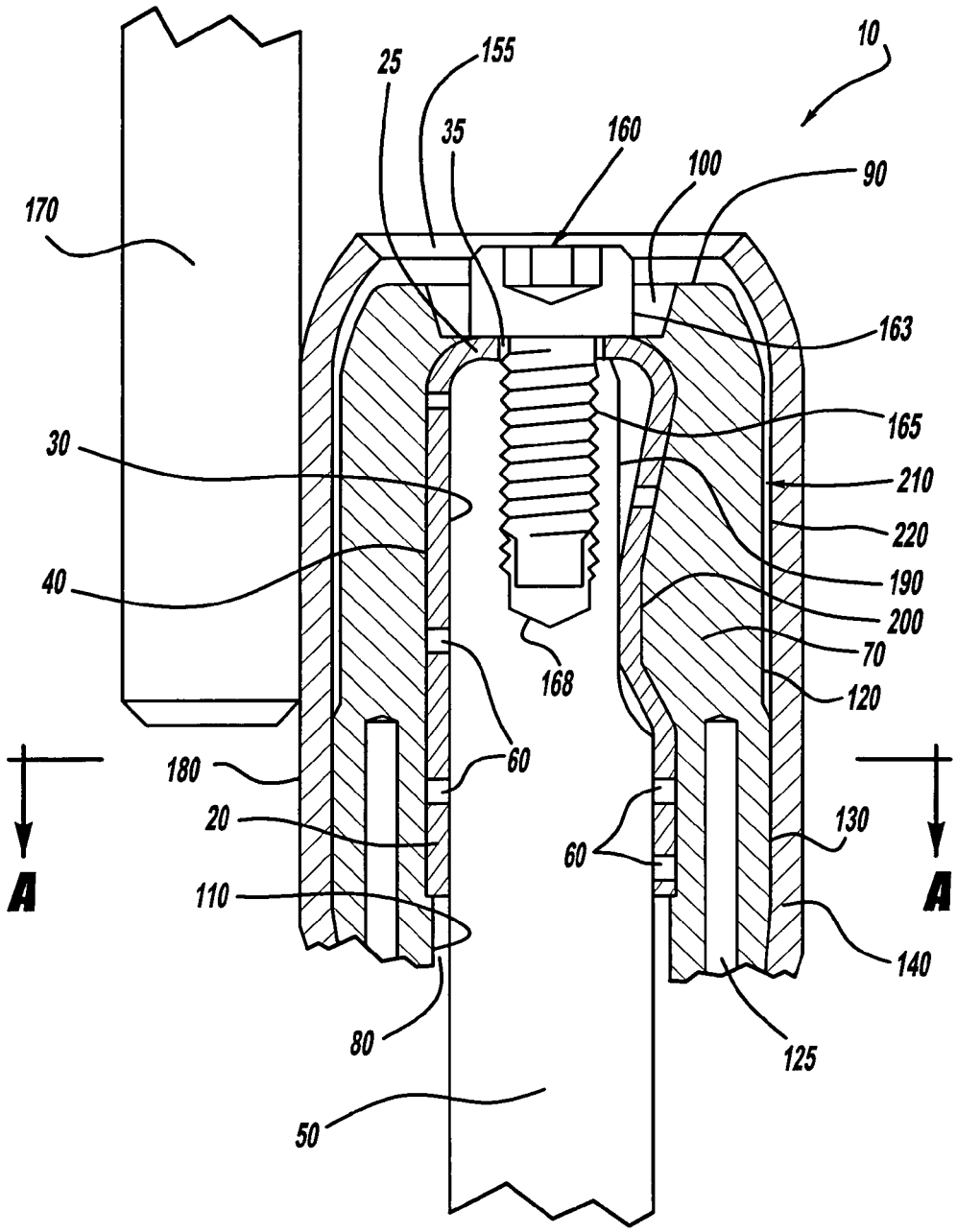
FIG. 1 illustrates a partial cross-sectional view of an offset transmission shift lever assembly and isolator arrangement showing a canister, an isolator and an insert in cross-section in accordance with the present invention.
Figure 2:
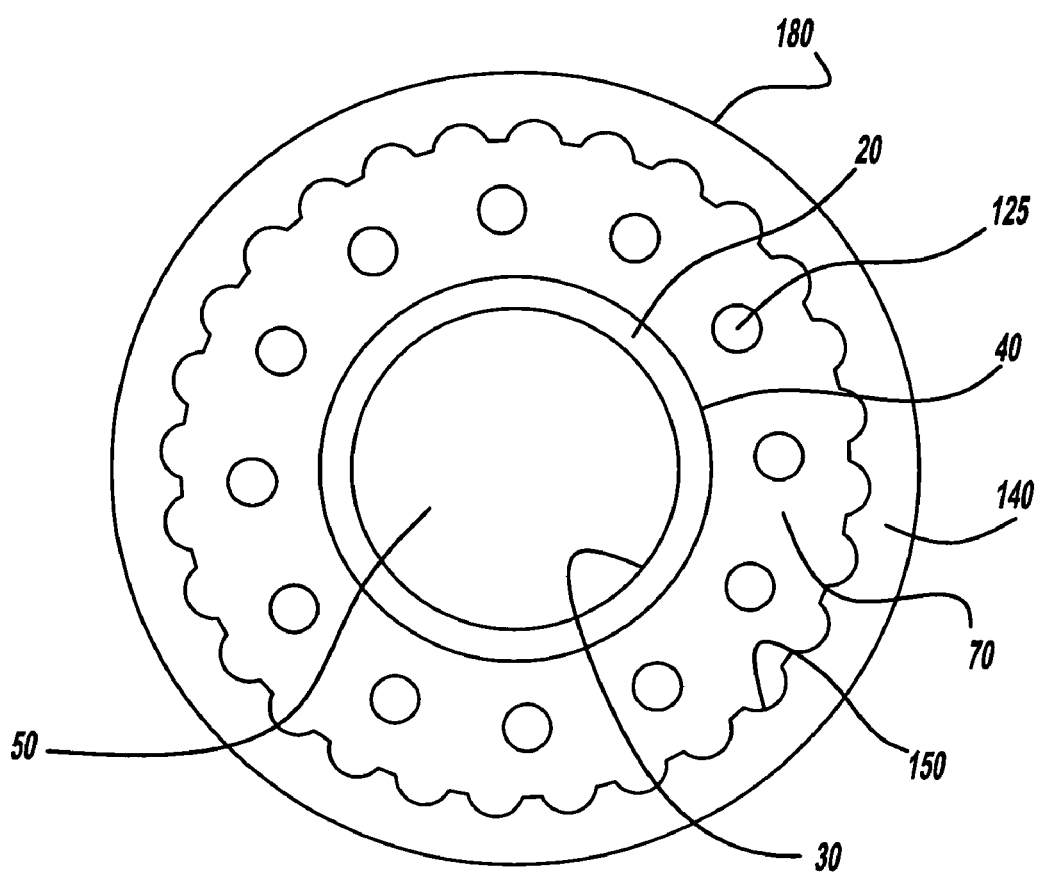
FIG. 2 illustrates a view along line A-A of the shift lever and isolator arrangement shown in FIG. 1 in accordance with the present invention.

Referring now to the drawings, FIGS. 1 and 2 illustrate an exemplary embodiment of an offset transmission shift lever and isolator arrangement. In accordance with one aspect of the present invention, an offset transmission shift lever and isolation assembly 10 is provided. Shift lever and isolation assembly 10 includes an insert 20 sized to fit securely over a manual transmission shift stub 50 that extends into a vehicle passenger compartment. Insert 20 is preferably made of steel and has an inner side 30, an outer side 40 and a series of circular apertures 60. Insert 20 also includes an upper end 25 with an opening 35 for receiving a fastener shank.

Formed to the outer side 40 of insert 20 is a preferably elastomeric isolator 70. Isolator 70 is generally cylindrically shaped with an open lower end 80 and an upper end 90 molded over the upper end 25 of insert 20. Isolator 70 also includes an opening 100 in upper end 90 arranged to provide clearance for a fastener. Isolator 70 has an inside diameter 110, an upper end outside diameter 120 that is smaller than a lower end outside diameter 130. Isolator 70 is preferably molded with insert 20 positioned within so as to allow isolator 70 to better grip insert 20 and allow elastomeric material to flow into apertures 60. It should be appreciated that the isolator material can form around and to insert 20 without the use of apertures 60. In addition, isolator 70 further includes a series of axial holes 125 positioned circumferentially around lower end 80 between inside diameter 110 and lower end outside diameter 130. Axial holes 125 extend, along with lower end outside diameter 130, from lower end 80 toward upper end 90 for a distance of one-third the axial length of isolator 70.

Encircling the isolator is a generally rigid canister 140. Canister 140 includes axial serrations 150 that cut into isolator 70 during assembly when isolator 70 is press fit into canister 140. Specifically, axial serrations 150 are arranged to cut into isolator 70 lower end outside diameter 130 during the assembly press fit operation. Canister 140 also includes an opening 155 for receiving a fastener 160.

Affixed to canister 140 is a shift lever 170. Shift lever 170 is preferably welded to an outside diameter 180 of canister 140. Shift lever 170 is positioned generally parallel to shift stub 50 and offset axially by the radial distance of the canister outside diameter 180 of canister 140 from a centerline of shift stub 50.

Shift stub 50 is provided with a machined flat section 190 to aid with assembly and orientation of shift lever assembly 10 to transmission shift stub 50. Flat section 190 acts as an indexing feature and mates with a corresponding flat section 200 on insert 20. The combination of indexing features 190 and 200 provide for orientation of the shift lever 170 during assembly of shift lever assembly 10 to transmission shift stub 50.

To install isolator assembly 10 to the vehicle transmission stub 50, insert 20 is inserted over shift stub 50 with insert indexing flat 200 aligning with shift stub flat 190. Fastener 160 is then used to secure insert 20 to transmission shift stub 50. Fastener shank 165 passes through canister opening 155, isolator opening 100, insert opening 35 and then into threaded bore 168 of transmission shift stub 50. Fastener head 163 directly contacts insert upper end 25 and secures insert 20 and thereby isolator assembly 10 to shift stub 50.

Upon inserting isolator 70 into canister 140, there is a designed gap 210 between isolator upper end outside diameter 120 and canister inside diameter 220. In operation, gap 210 in combination with axial holes 125 provide isolation of powertrain vibrations and excitations applied to shift stub 50 from canister 140 and shift lever 170. Although isolator 70 directly interfaces via a press fit with canister 140 at isolator lower end outside diameter 130, axial serrations 150 provide for a minimum press fit while preventing movement of isolator lower end outside diameter 130 relative to canister 140. In addition, axial holes 125 effectively reduce the stiffness of the rubber for the axial length of isolator lower end outside diameter 130 that contacts canister 140 via a press fit. The minimum press fit combined with axial holes 125 and gap 210 mentioned above, allow shift stub 50 to vibrate from powertrain excitations without transferring such vibrations to shift lever 170 thereby preventing a vehicle occupant from sensing a vibrating shift lever. Specifically, this combination acts as a predamper and allows the transmission shift stub 50 to move back and forth without exciting or moving the shift lever 170. Incorporation of voids and varying diameters into isolator 70 provides for superior benefits to that of a multi-durometer isolator without the added cost and complexity in molding and assembling the isolator assembly.

The foregoing description constitutes the embodiments devised by the inventors for practicing the invention. It is apparent, however, that the invention is susceptible to modification, variation, and change that will become obvious to those skilled in the art. Inasmuch as the foregoing description is intended to enable one skilled in the pertinent art to practice the invention, it should not be construed to be limited thereby but should be construed to include such aforementioned obvious variations and be limited only by the proper scope or fair meaning of the accompanying claims.

What is claimed is:

1. An offset shift lever and isolator arrangement for a vehicle transmission, the arrangement comprising:
    a shift stub connected to the transmission and extending into a vehicle compartment, the shift stub having an axially threaded bore;
    an insert arranged to fit over the shift stub, the insert having a partially closed upper end with a fastener shank extending therethrough;
    an isolator encircling and formed over the insert, the isolator having an upper end and a lower end, the isolator having a plurality of axial holes formed in the lower end of the isolator and partially extending toward the upper end of the isolator, the isolator having an outside diameter at the upper end that is smaller than an outside diameter at the lower end;
    a canister encircling the isolator and having an inner surface and an outer surface, the canister having an open lower end for receiving the isolator and an upper end with an opening for receiving a fastener, wherein the isolator is arranged to be press fit into the canister with the isolator lower end outside diameter being press fit against the canister inner surface and the isolator having a space between the canister inner surface and the isolator upper end diameter;
    a shift lever affixed to the canister outer surface, the shift lever being aligned generally parallel and axially off center to the shift stub; and
    a fastener for securing the insert to the shift stub, the fastener arranged to threadably engage the threaded bore in the shift stub;
    wherein the isolator is arranged to absorb powertrain excitations applied to the shift stub to isolate the excitations from the shift lever.

2. The offset transmission shift lever and isolation arrangement of claim 1, wherein the insert further includes a plurality of apertures formed therein, and wherein the isolator is formed over the insert and into the apertures.

3. The offset transmission shift lever and isolation arrangement of claim 1, wherein the canister further includes axial serrations on its inner surface for a portion of the inner surface that contacts the isolator lower end outside diameter.

4. The offset transmission shift lever and isolation arrangement of claim 1, wherein the isolator comprises an elastomeric isolator.

5. The offset transmission shift lever and isolation arrangement of claim 1, wherein the shift stub further includes a flat portion on an end of the stub extending into the vehicle interior compartment, and wherein the insert further includes a flat portion on an upper end thereof, the insert flat portion arranged to align with the shift stub flat portion during assembly of the insert onto the shift stub.

6. The offset transmission shift lever and isolation arrangement of claim 1, wherein the shift stub comprises a manual transmission shift stub.

7. The offset transmission shift lever and isolation arrangement of claim 1, wherein the plurality axial holes in the isolator comprises twelve holes.

8. The offset transmission shift lever and isolation arrangement of claim 1, wherein the isolator upper end outside diameter extends axially from the isolator upper end toward the isolator lower end for a length of two-thirds of a total axial length of the isolator.

9. The offset transmission shift lever and isolation arrangement of claim 8, wherein the isolator lower end outside diameter extends axially from the isolator lower end toward the isolator upper end until mating with the isolator upper end outside diameter.

10. The offset transmission shift lever and isolation arrangement of claim 1, wherein the isolator further comprises an inside diameter, and wherein the plurality of axial holes are centered radially between the isolator inside diameter and the isolator lower end outside diameter.

* * * * *